United States Patent
Chen (10) Patent No.: US 12,047,791 B2
(45) Date of Patent: Jul. 23, 2024

(54) METHOD FOR DETERMINING MONITORING RESULT AND TERMINAL

(71) Applicant: VIVO MOBILE COMMUNICATION CO., LTD., Chang'an Dongquan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 647 days.

(21) Appl. No.: 17/152,407

(22) Filed: Jan. 19, 2021

(65) Prior Publication Data

US 2021/0219153 A1 Jul. 15, 2021

Related U.S. Application Data (63) Continuation of application No. PCT/CN2019/094544, filed on Jul. 3, 2019.

(30) Foreign Application Priority Data

Jul. 18, 2018 (CN) .......................... 201810793153.4

(51) Int. Cl.
H04W 24/08 (2009.01)
H04L 5/00 (2006.01)
H04W 72/0453 (2023.01)

(52) U.S. Cl.
CPC ........... *H04W 24/08* (2013.01); *H04L 5/0048* (2013.01); *H04W 72/0453* (2013.01)

(58) Field of Classification Search
CPC .. H04W 24/08; H04W 72/0453; H04L 5/0048
See application file for complete search history.

(56) References Cited

U.S. PATENT DOCUMENTS

| 2012/0147755 A1 | 6/2012 | Chen et al. |
| 2018/0049047 A1 | 2/2018 | Lin et al. |
| 2018/0054290 A1 | 2/2018 | Park et al. |

FOREIGN PATENT DOCUMENTS

| CN | 101998431 A | 3/2011 |
| CN | 101998474 A | 3/2011 |
| CN | 102104892 A | 6/2011 |
| CN | 104113928 A | 10/2014 |
| CN | 106688190 A | 5/2017 |

(Continued)

OTHER PUBLICATIONS

Chinese Office Action related to Application No. 201810793153.4 reported on Jan. 4, 2022.

(Continued)

*Primary Examiner* — Elton Williams (74) *Attorney, Agent, or Firm* — von Briesen & Roper, s.c.

(57) ABSTRACT

A method of determining a monitoring result and a terminal are provided. The method of determining the monitoring result, performed by a terminal, includes: determining, in a case that processes of one or more reference states are running, whether a process of a target reference state satisfies a preset condition according to a monitoring configuration parameter of a reference state; determining a monitoring result corresponding to the target reference state in a (Continued)

case that a process of the target reference state satisfies the preset condition; wherein the reference state includes: Radio Link Monitor RLM and/or Beam Failure Detection BFD.

18 Claims, 2 Drawing Sheets

(56) References Cited

FOREIGN PATENT DOCUMENTS

| WO | 2018082521 A1 | 5/2018 | |
| WO | WO-2018082521 A1 * | 5/2018 | ......... H04L 41/0806 |

OTHER PUBLICATIONS

Japanese Office Action related to Application No. 2021-502788 reported on Feb. 17, 2022.
R2-1708737—Source: InterDigital Inc. "RLM/RLF for NR", Agenda Item: 10.2,9, Document for: Discussion, Decision, 3GPP TSG-RAN WG2 Meeting #99 Berlin, Germany, Aug. 21-25, 2017.
R2-1805201—Source: Qualcomm Incorporated. "Discussion of RLF caused by beam failure recovery", Agenda Item: 10.2.4, WID/SID: NR_newRAT-Core—Release 15, Document for: Discussion, Decision, 3GPP TSG-RAN WG2 Meeting #101 bis Sanya, China, Apr. 16-20, 2018.
Extended European Search Report for related Application No. 19838583.3; reported on Aug. 18, 2021.
Huawei Hisilicon, "Remaining details on NR RLM", May 21-25, 2018, 3GPP TSG RAN WG1 Meeting #93, Busan, Korea.
ZTE Corporation, Sanechips, "Clarification the SSB based BM, BFD and RLM with the operation of BWPs", Apr. 16-20, 2018, 3GPP TSG-RAN WG2 Meeting #101bis, Sanya, China.
ZTE Corporation, Sanechips, "Consideration on Beam Failure Detection During BWP Switch", Apr. 16-20, 2018, 3GPP TSG-RAN WG2 Meeting #101bis, Sanya, China.
Huawei Hisilicon, "Reset of BFR timers and counters with RLM reconfiguration", May 21-25, 2018, 3GPP TSG-RAN WG1 Meeting 102 Busan, South Korea.
Japanese Notice of Reasons for Refusal for related Application No. 2021-502788; reported on Sep. 30, 2022.
Huawei, Hisilicon, "RLM and Beam Failure Recovery Procedure", Sep. 18-21, 2017, 3GPP TSG RAN WG1 Meeting NR#3, Nagoya, Japan, R1-1715391.
Vivo, "RLM / RLF in NR", Aug. 21-25, 2017, 3GPP TSG-RAN WG2 Meeting #99, Berlin, Germany, R2-1708417.
International Search Report & Written Opinion related to Application No. PCT/CN2019/094544; reported on Aug. 27, 2019.
First Chinese Office Action for related Application No. 201810793153.4; reported on Jun. 2, 2020.
Second Chinese Office Action for related Application No. 201810793153.4; reported on Jan. 5, 2021.
Samsung, "[RIL S034] RLM signalling for BWP", Feb. 26-Mar. 2, 2018, 3GPP TSG-RAN2#101, Athens, Greece.

* cited by examiner

METHOD FOR DETERMINING MONITORING RESULT AND TERMINAL

CROSS-REFERENCE TO RELATED APPLICATION

This application is a continuation application of a PCT Application No. PCT/CN2019/094544 filed on Jul. 3, 2019, which claims a priority to the Chinese patent application No. 201810793153.4 filed in China on Jul. 18, 2018, a disclosure of which is incorporated herein by reference in its entirety.

TECHNICAL FIELD

The present disclosure relates to the field of communications technologies, and in particular, related to a method of determining a monitoring result and a terminal.

BACKGROUND

In a radio link monitor (radio link monitor, RLM) function of long term evolution (Long Term Evolution, LTE), user equipment (User Equipment, UE) monitors a radio link by measuring signal to an interference plus noise ratio (Signal to Interference plus Noise Ratio, SINR) of part of cell reference signals (Cell Reference Signal, CRS) of a physical downlink control channel (Physical Downlink Control Channel, PDCCH). In a case that the measured part of the CRSs of the PDCCH is less than a certain threshold, the radio link is determined to be "out-of-synchronization" (Out-of-Sync, OOS). A physical layer notifies a higher-layer (a radio resource control (Radio Resource Control, RRC) layer) of an out-of-sync (OOS) indication. If the RRC layer receives N consecutive out-of-sync indications, then the UE starts a timer T1.

In a case that the measured part of the CRSs of the PDCCH is greater than the certain threshold, the radio link is determined to be "in-synchronization" (In-Sync, IS). The physical layer notifies the higher-layer (RRC layer) of an in-sync (IS) indication. If the RRC layer receives M consecutive in-sync indications, then the UE stops the timer T1.

If the timer T1 expires, then the UE determines that a radio link failure (Radio link failure, RLF) occurs.

The number of times of counting "out-of-sync" and the number of times of counting "in-sync" are configured by a network, which is N or M. If the number of times is reached, then a running duration of the timer is also configurable by a network side.

In a 5th generation new radio (5th Generation New Radio, 5G NR) system, it is agreed in a NR discussion at a RNA1 meeting that a reference signal for RLM in NR is different from that in LTE, a channel state information reference signal (Channel State Information Reference Signal, CSI-RS) and/or a synchronization signal block (Synchronisation Signal Block, SSB) are used as a reference signal for RLM.

The SSB and the CSI-RS are two reference signals in the NR.

Beam failure detection (Beam failure detection, BFD) also has a similar implementation process to that for RLM.

In the related art, a network configures a parameter of radio link monitor (or beam failure detection) in a serving cell for a user. In a case that a reference signal of the radio link monitor (or beam failure detection) is reset, a running counter or a running timer for the RLM (or BFD) is reset. However, it is not determined in the related art how to determine RLF (or beam failure recovery (Beam Failure Recovery, BFR)) in a case that multiple RLM (or BFD) processes run simultaneously.

SUMMARY

Some embodiments of the present disclosure provide a method of determining a measurement result and a terminal in order to solve the problem that there is no clear definition of how to determine RLF (or BFR) in the related art, which results in inability to guarantee reliability of network communication, in a case that multiple RLM (or BFD) processes run at the same time.

To solve the above technical problem, the following solutions are adopted in the present disclosure.

In a first aspect, some embodiments of the present disclosure provide a method of determining a monitoring result, and the method is performed by a terminal and includes: determining, in a case that processes of one or more reference states are running, whether a process of a target reference state satisfies a preset condition according to a monitoring configuration parameter of a reference state; determining a monitoring result corresponding to the target reference state in a case that the process of the target reference state satisfies the preset condition; wherein the reference state includes Radio Link Monitor (RLM) and/or Beam Failure Detection (BFD).

In a second aspect, some embodiments of the present disclosure provide a terminal, and the terminal includes: a judgement module, used to determine, in a case that processes of one or more reference states are running, whether a process of a target reference state satisfies a preset condition according to a monitoring configuration parameter of a reference state; a determination module, used to determine a monitoring result corresponding to the target reference state in a case that the process of the target reference state satisfies the preset condition; wherein the reference state includes Radio Link Monitor (RLM) and/or Beam Failure Detection (BFD).

In a third aspect, some embodiments of the present disclosure provide a terminal, and the terminal includes: a storage, a processor, and a computer program stored on the storage and executable by the processor, wherein in a case that the computer program is executed by the processor, steps of the method of determining the monitoring result described above are implemented.

In a fourth aspect, some embodiments of the present disclosure provide a computer readable storage medium, wherein a computer program is stored on the computer readable storage medium; in a case that the computer program is executed by a processor, steps of the method of determining the monitoring result described above are implemented.

Beneficial effects of the present disclosure are as follows.

In the above solutions, in a case that processes of one or more reference states (RLM or BFD) are running, it is determined whether a process of a target reference state satisfies a preset condition according to a monitoring configuration parameter of a reference state, a monitoring result corresponding to the target reference state is determined; it is specified how to determine a monitoring result in a case that multiple RLM (or BFD) processes run at the same time, so as to improve a communication process and ensure reliability of network communication.

DETAILED DESCRIPTION

In order to make objects, technical solutions and advantages of the present disclosure clearer, the present disclosure will be clearly and completely described in detail below with reference to drawings and specific embodiments.

In proceeding with description of some embodiments of the present disclosure, some of concepts used in the following description are first explained and illustrated.

In 5G NR systems, a cell supports a maximum system bandwidth up to 400 MHz, which is much larger than a maximum bandwidth of 20 MHz in LTE systems, to support larger systems and higher user throughput. However, supporting such a large system bandwidth is a huge challenge for realization of UE, which is not conducive to realization of low-cost UE. Therefore, dynamic and flexible bandwidth allocation is also supported in the 5G NR systems, a system bandwidth is divided into multiple bandwidth parts (bandwidth part, BWP), to support access of narrowband user terminals or user terminals in energy-saving mode.

An operating band above 6 GHz is supported in the 5G NR systems, which may provide higher throughput for data transmission. A high-frequency signal has a short wavelength, more antenna elements may be arranged on a panel with the same size, compared with a low-frequency band, and multiple beams with stronger directivity and narrower lobes are formed by adopting beamforming technology. In the 5G NR systems, beam scanning technology is used to send broadcast signals or system information to user terminals in a cell.

At the same time, configuring different Numerology (i.e., parameter configuration) in different bandwidths is supported in a NR cell. In a case that the UE cannot support all Numerology of the cell, a corresponding frequency band may be avoided from being allocated to the UE when a BWP is configured for the UE.

The network configures a BWP set available for each cell for UE via a RRC signaling, and may dynamically switch, via a L1 signaling, a BWP that needs to be started, that is, a currently activated BWP is deactivated in a case that a BWP is activated. In addition, BWP switching may also be controlled through a bwp-inactiveTimer (an activation timer), that is, the UE autonomously switches to a default (default) downlink (DownLink, DL) BWP or an initial (initial) DL BWP in a case that the timer expires.

The present disclosure provides a method of determining a measurement result and a terminal, in view of the problem that there is no clear definition of how to determine RLF (or BFR) in the related art, which results in inability to guarantee reliability of network communication, in a case that multiple RLM (or BFD) processes run at the same time.

Figure 1:
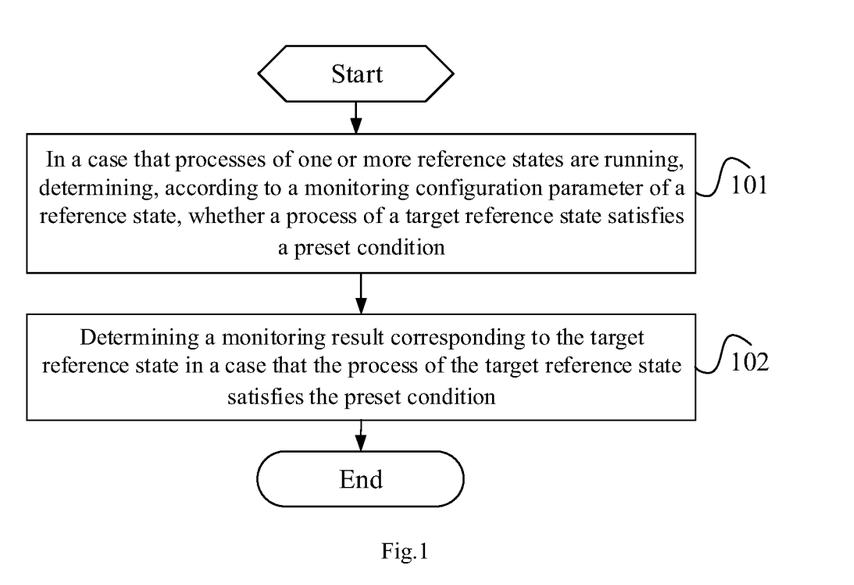
FIG. 1 is a schematic flowchart of a method of determining a monitoring result according to some embodiments of the present disclosure.

As shown in FIG. 1, some embodiments of the present disclosure provide a method of determining a monitoring result, and the method is performed by a terminal and includes following steps.

Step 101: in a case that processes of one or more reference states are running, determining, according to a monitoring configuration parameter of a reference state, whether a process of a target reference state satisfies a preset condition.

It should be noted that, the reference state includes: radio link monitor (RLM) and/or Beam Failure Detection (BFD).

Step 102: determining a monitoring result corresponding to the target reference state in a case that the process of the target reference state satisfies the preset condition.

Specifically, it should be noted that, the process of the target reference state includes: at least one of the processes of one or more reference states; further, the process of the target reference state refers to any one of the processes of one or more reference states; the process of the target reference state may also be a process of a predetermined part of reference states among the processes of the one or more reference states, or processes of all reference states among the processes of the one or more reference states; the process of the target reference state may also be a process of a predetermined reference state among the processes of the one or more reference states.

It should be noted that, the process of the target reference state includes at least one of:

A1, a reference state run on an initial BWP;

A2, a reference state run on a first activated BWP;

A3, a reference state run on a serving cell;

A4, a reference state run on a primary cell;

A5, a reference state run on a BWP, a cell or a RS, where there is a cell-defined synchronization signal block;

A6, a reference state run on a cell, a BWP or a RS, where there is preset indication information.

The preset indication information is used to indicate a serving cell, a BWP of a serving cell, or a RS of a serving cell.

Further, it should be noted that, in a case that the process of the target reference state is the process of the predetermined reference state among the processes of one or more reference states, the process of the reference state may be any one of A1-A6.

Further, it should be noted that, the monitoring configuration parameter is configured by a network device for the terminal, and the monitoring configuration parameter includes at least one of the following information B1-B7.

B1, a set of reference state configuration parameters configured for the terminal.

In this case, the reference state configuration parameters are configured for each terminal, that is, a terminal has a set of reference state configuration parameters, that is, a terminal has a set of RLM parameters, or a terminal has a set of BFD parameters.

B2, at least one set of reference state configuration parameters configured for at least one Reference Signal (RS) of the terminal.

It should be noted that, the RS includes a SSB and/or a CSI-RS.

In this case, a reference state configuration parameter is configured for a RS, that is, a reference signal of the terminal is configured with at least one set of reference state configuration parameters. It should be further noted that, a configuration of the reference state configuration parameter does not necessarily need to correspond strictly to the RS. Specifically, a condition of the configuration may be as follows: each RS of the terminal is configured with a set of reference state configuration parameters; the condition of the configuration may optionally be as follows: only some RSs are configured with reference state configuration parameters.

B3, at least one set of reference state configuration parameters configured for at least one RS set of the terminal.

In this case, a reference state configuration parameter is configured for a RS set, that is, a RS set of the terminal is configured with at least one set of reference state configuration parameters. It should be further noted that, the reference state configuration parameter does not necessarily need to correspond strictly to the RS set. Specifically, a condition of the configuration may be as follows: each RS set of the terminal is configured with a set of reference state configuration parameters; the condition of the configuration may optionally be as follows: only some RS sets are configured with reference state configuration parameters.

B4, at least one set of reference state configuration parameters configured for at least one bandwidth part (BWP) of the terminal.

At least one BWP includes: at least one activated BWP and/or at least one configured BWP.

In this case, a reference state configuration parameter is configured for a BWP, that is, a BWP (the BWP may be an activated BWP of the terminal, or may also be a configured BWP of the terminal) is configured with at least one set of reference state configuration parameters. It should be further noted that, the reference state configuration parameter does not necessarily need to correspond strictly to the BWP. Specifically, a condition of the configuration may be as follows: each BWP of the terminal is configured with a set of reference state configuration parameters; the condition of the configuration may optionally be as follows: only some BWPs are configured with reference state configuration parameters.

B5, at least one set of reference state configuration parameters configured for at least one cell of the terminal.

At least one cell includes: at least one serving cell and/or at least one configured cell.

In this case, a reference state configuration parameter is configured for a cell, that is, a cell (the cell may be a cell of the terminal, or may also be a serving cell of the terminal, or may also be a cell configured for the terminal) is configured with at least one set of reference state configuration parameters. It should be further noted that, the reference state configuration parameter does not necessarily need to correspond strictly to the cell. Specifically, the condition of the configuration may be as follows: each cell of the terminal is configured with a set of reference state configuration parameters; the condition of the configuration may optionally be as follows: only some cells are configured with reference state configuration parameters.

B6, at least one set of reference state configuration parameters configured for at least one carrier of the terminal.

In this case, a reference state configuration parameter is configured for a carrier, that is, a carrier of the terminal is configured with at least one set of reference state configuration parameters. It should be further noted that, the reference state configuration parameter does not necessarily need to correspond strictly to the carrier. Specifically, a condition of the configuration may be as follows: each carrier of the terminal is configured with a set of reference state configuration parameters; the condition of the configuration may optionally be as follows: only some carriers are configured with reference state configuration parameters.

B7, at least one set of reference state configuration parameters configured for at least one bandwidth of the terminal or at least one combination of bandwidths of the terminal.

In this case, a reference state configuration parameter is configured for a bandwidth (or a combination of bandwidths), that is, all bandwidths (or all combinations of bandwidths) of the terminal are configured with at least one set of reference state configuration parameters. It should be further noted that, the reference state configuration parameter does not necessarily need to correspond strictly to the bandwidth (or the combination of bandwidths). Specifically, a condition of the configuration may be as follows: each bandwidth (or each combination of bandwidths) of the terminal is configured with a set of reference state configuration parameters; the condition of the configuration may optionally be as follows: only some bandwidths (or some combinations of bandwidths) are configured with reference state configuration parameters.

Further, the above at least one set of reference state configuration parameters includes at least one of: a preset counter for the reference state and a timing duration of a timer for the reference state.

It should be specifically noted that, the preset counter includes an out-of-synchronization counter and an in-synchronization counter in a case that the reference state includes RLM, wherein, the out-of-synchronization counter is used to count out-of-synchronization indications from a bottom layer, and the in-synchronization counter is used to count in-synchronization indications; the preset counter includes a beam failure instance counter in a case that the reference state includes BFD, wherein the beam failure instance counter is used to count beam failure instances (Beam Failure Instance) indicated by the bottom layer.

Further, the preset conditions used are also different when determination is performed, in a case that the reference states are different. The preset conditions are described below.

1. In a case that the reference state includes the RLM, the preset condition includes that the timer expires.

The preset timer starts in a case that a first preset number of consecutive out-of-synchronization indications are received from a bottom layer, and the timer stops running in a case that a second preset number of consecutive in-synchronization indications are received before expiration.

2. In a case that the reference state includes the BFD, the preset condition includes that the beam failure instance counter reaches a third preset number.

In a case that a beam failure instance indicated by the bottom layer is received, a count value of the beam failure instance counter is increased by one, and the timer starts, and the count value of the beam failure instance counter is reset in a case that the timer expires.

Specifically, at least one of the following manners C1-C6 is included in a case that Step 102 is specifically implemented (that is, a monitoring result corresponding to the target reference state includes at least one of the following manners).

C1, indicating a higher-layer of the terminal.

That is, a bottom layer of the terminal reports to a higher-layer of the terminal that a process of a target reference state satisfies the preset condition.

C2, declaring (declare) as RLF or determining Beam Failure Recovery (BFR).

It should be noted that, declaring as RLF is performed by the terminal in a case that the reference state includes RLM; determining BFR or declaring as RLF is performed by the terminal in a case that the reference state includes BFD.

C3, determining that a reference state on at least one target resource of an upper layer of the terminal satisfies the preset condition.

Specifically, the target resource includes: a RS, a RS set, a BWP, a cell, a carrier, a bandwidth or a combination of bandwidths.

C4, triggering, in a case that a reference state on at least one target resource satisfies the preset condition, RLF or BFR on the corresponding at least one target resource.

It should be noted that, RLF is triggered in a case that the reference state includes RLM; RLF or BFR is triggered in a case that the reference state includes BFD.

C5, initiating, in a case that a reference state on at least one target resource satisfies the preset condition, a Radio Resource Control (RRC) reestablishment on the corresponding at least one target resource.

C6, reporting reported information to a network device.

It should be further noted that, the reported information includes at least one of the following information D1-D3.

D1, that the process of the target reference state satisfies a preset condition.

It should be noted that, in this case, a process of one or more reference states of a RS, a RS set, a BWP, a cell, a carrier, a bandwidth or a combination of bandwidths reported by the terminal satisfies a preset condition.

D2, that the process of the target reference state triggers RLF or BFR on a target resource.

It should be noted that, RLF is triggered in a case that the reference state includes RLM; BFR is triggered in a case that the reference state includes BFD.

In this case, the terminal triggers RLF or BFR on at least one RS, at least one RS set, at least one BWP, at least one cell, at least one carrier, at least one bandwidth or at least one combination of bandwidths. The at least one RS, the at least one RS set, the at least one BWP, the at least one cell, the at least one carrier, the at least one bandwidth or the at least one combination of bandwidths respectively refers to one RS, one RS set, one BWP, one cell, one carrier, one bandwidth or one combination of bandwidths; or part of RSs, part of RS sets, part of BWPs, part of cells, part of carriers, part of bandwidths or part of combinations of bandwidths; or all RSs, all RS sets, all BWPs, all cells, all carriers, all bandwidths, or all combinations of bandwidths.

D3, that the process of the target reference state initiates a RRC reestablishment on a target resource.

In this case, the terminal initiates a RRC reestablishment on at least one RS, at least one RS set, at least one BWP, at least one cell, at least one carrier, at least one bandwidth or at least one combination of bandwidths. The at least one RS, the at least one RS set, the at least one BWP, the at least one cell, the at least one carrier, the at least one bandwidth or the at least one combination of bandwidths respectively refers to one RS, one RS set, one BWP, one cell, one carrier, one bandwidth or one combination of bandwidths; or part of RSs, part of RS sets, part of BWPs, part of cells, part of carriers, part of bandwidths or part of combinations of bandwidths; or all RSs, all RS sets, all BWPs, all cells, all carriers, all bandwidths, or all combinations of bandwidths.

A reference state including RLM is taken as an example below, the specific implementation process of some embodiments of the present disclosure is described in detail as follows.

In a case that one or more RLM processes run at the same time, the terminal may perform at least one of the following processes E1-E6.

E1, a higher-layer of the terminal is indicated in a case that any RLM process satisfies a preset condition.

E2, RLF is declared in a case that any RLM process satisfies a preset condition.

E3, in a case that any RLM process satisfies a preset condition, it is determined that RLM on at least one RS, at least one RS set, at least one BWP, at least one cell, at least one carrier, at least one bandwidth or at least one combination of bandwidths of an upper layer of the terminal satisfies a preset condition.

E4, in a case that any RLM process satisfies a preset condition, RLF is triggered on at least one RS, at least one RS set, at least one BWP, at least one cell, at least one carrier, at least one bandwidth or at least one combination of bandwidths corresponding to the RLM process.

E5, in a case that any RLM process satisfies a preset condition, a RRC reestablishment is initiated on at least one RS, at least one RS set, at least one BWP, at least one cell, at least one carrier, at least one bandwidth or at least one combination of bandwidths corresponding to the RLM process.

E6, in a case that any RLM process satisfies a preset condition, reported information is reported to a network device.

It should be noted that, in a case that one or more RLM processes run at the same time, some or all of RLM processes satisfy a preset condition, or a predetermined RLM process satisfies a preset condition, an execution process of the terminal is similar to the foregoing execution process, and will not be repeated here.

In a case that the reference state includes BFD, an execution process of the terminal is similar to the execution process of the terminal in a case that the reference state includes RLM, and will not be repeated here.

It should be noted that, the above embodiments of the present disclosure may be used in 5G or eLTE or other scenarios with similar configurations.

In some embodiments of the present disclosure, in a case that processes of one or more reference states (RLM or BFD) are running, it is determined whether a process of a target reference state satisfies a preset condition according to a monitoring configuration parameter of a reference state, a monitoring result corresponding to the target reference state is determined; it is specified how to determine a monitoring result in a case that multiple RLM (or BFD) processes run at the same time, so as to improve a communication process and ensure reliability of network communication.

Figure 2:
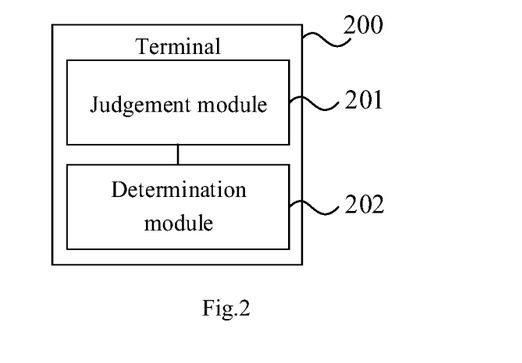
FIG. 2 is a schematic diagram illustrating modules of a terminal according to some embodiments of the present disclosure.

As shown in FIG. 2, some embodiments of the present disclosure provide a terminal 200, the terminal 8200 includes a judgement module 201 and a determination module 202.

The judgement module 201 is used to determine, in a case that processes of one or more reference states are running, whether a process of a target reference state satisfies a preset condition according to a monitoring configuration parameter of a reference state.

The determination module 202 is used to determine a monitoring result corresponding to the target reference state in a case that the process of the target reference state satisfies the preset condition.

The reference state includes: Radio Link Monitor (RLM) and/or Beam Failure Detection BFD.

Specifically, the monitoring configuration parameter includes at least one of following: a set of reference state configuration parameters configured for the terminal; at least one set of reference state configuration parameters configured for at least one Reference Signal (RS) of the terminal; at least one set of reference state configuration parameters configured for at least one RS set of the terminal; at least one set of reference state configuration parameters configured for at least one bandwidth part (BWP) of the terminal; at least one set of reference state configuration parameters configured for at least one cell of the terminal; at least one set of reference state configuration parameters configured for at least one carrier of the terminal; at least one set of reference state configuration parameters configured for at least one bandwidth of the terminal or at least one combination of bandwidths of the terminal.

Further, the at least one BWP includes: at least one activated BWP and/or at least one configured BWP; the at least one cell includes: at least one serving cell and/or at least one configured cell.

Further, at least one set of reference state configuration parameters includes at least one of following: a preset counter for the reference state, a timing duration of a timer for the reference state.

The preset counter includes an out-of-synchronization counter and an in-synchronization counter in a case that the reference state includes RLM; the preset counter includes a beam failure instance counter in a case that the reference state includes BFD.

Further, in a case that the reference state includes the RLM, the preset condition includes that the timer expires.

The preset timer starts in a case that a first preset number of consecutive out-of-synchronization indications are received from a bottom layer, and the timer stops running in a case that a second preset number of consecutive in-synchronization indications are received before expiration.

In a case that the reference state includes the BFD, the preset condition includes that the beam failure instance counter reaches a third preset number.

In a case that a beam failure instance indicated by the bottom layer is received by the beam failure instance counter, a count value of the beam failure instance counter is increased by one, and the timer starts, and the count value of the beam failure instance counter is reset in a case that the timer expires.

Optionally, the determination module 202 performs at least one of the following: indicating a higher-layer of the terminal; declaring as RLF or determining Beam Failure Recovery (BFR); determining that a reference state on at least one target resource of an upper layer of the terminal satisfies a preset condition; triggering, in a case that a reference state on at least one target resource satisfies a preset condition, RLF or BFR on the corresponding at least one target resource; initiating, in a case that a reference state on at least one target resource satisfies a preset condition, a Radio Resource Control (RRC) reestablishment on the corresponding at least one target resource; reporting reported information to a network device; wherein, the target resource includes: a RS, a RS set, a BWP, a cell, a carrier, a bandwidth or a combination of bandwidths.

Specifically, the reported information includes at least one of the following information: that the process of the target reference state satisfies the preset condition; that the process of the target reference state triggers RLF or BFR on a target resource; that the process of the target reference state initiates a RRC reestablishment on a target resource.

Optionally, the process of the target reference state includes: at least one of the processes of one or more reference states.

Optionally, the process of the target reference state includes at least one of: a reference state run on an initial BWP; a reference state run on a first activated BWP; a reference state run on a serving cell; a reference state run on a primary cell; a reference state run on a BWP, a cell or a RS, where there is a cell-defined synchronization signal block; a reference state run on a cell, a BWP or a RS, where there is preset indication information; wherein the preset indication information is used to indicate a serving cell, a BWP of a serving cell, or a RS of a serving cell.

It should be noted that, the embodiment of the terminal is a terminal corresponding to the above method of determining the monitoring result performed at a terminal side. All implementations of the above embodiments are applicable to the embodiment of the terminal, and the same technical effects may be achieved.

Figure 3:
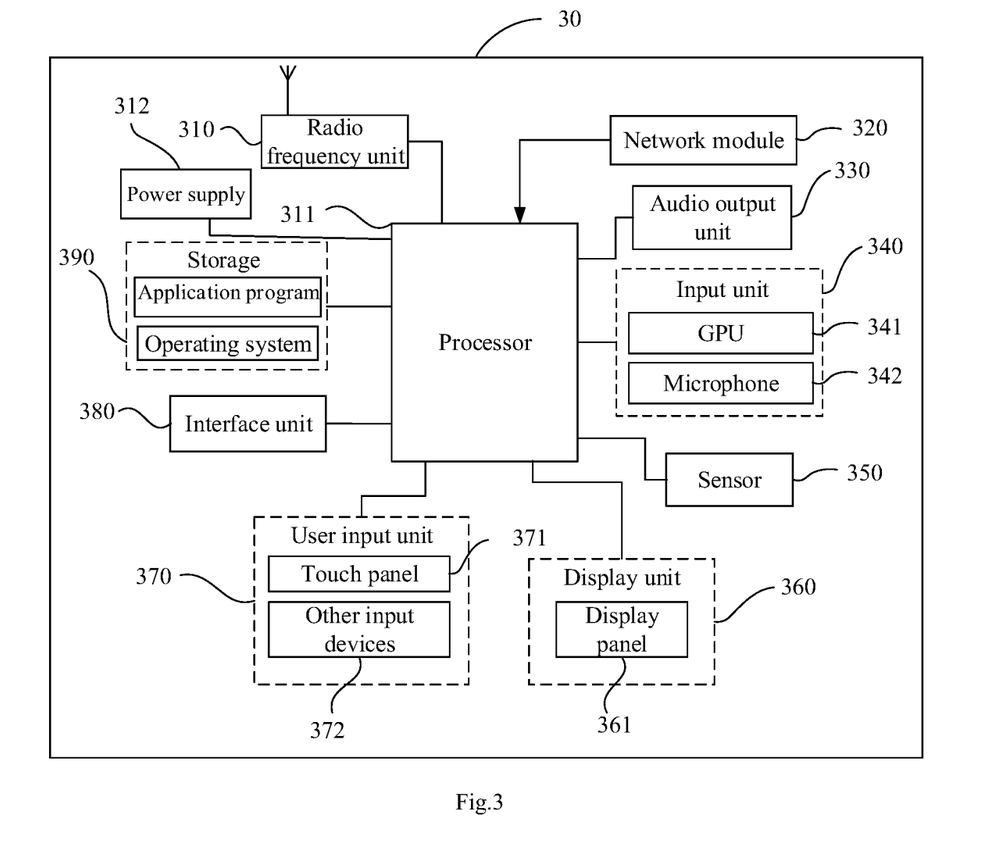
FIG. 3 is a structural block diagram illustrating a terminal according to some embodiments of the present disclosure.

FIG. 3 is a schematic diagram of a hardware structure of a terminal according to some embodiments of the present disclosure.

A terminal 30 includes, but is not limited to, a radio frequency unit 310, a network module 320, and an audio output unit 330, an input unit 340, a sensor 350, a display unit 360, a user input unit 370, an interface unit 380, a storage 390, a processor 311, and a power supply 312 and other components. Those skilled in the art may understand that the structure of the terminal shown in FIG. 3 does not constitute a limitation on the terminal, and the terminal may include more or fewer components than shown in the figure, or some combined components, or different arrangements of components. In some embodiments of the present disclosure, the terminal includes, but is not limited to, a mobile phone, a tablet computer, a notebook computer, a palmtop computer, a car terminal, a wearable device, a pedometer, and the like.

The processor 311 is used to determine, in a case that processes of one or more reference states is running, whether a process of a target reference state satisfies a preset condition according to a monitoring configuration parameter of a reference state; determine a monitoring result corresponding to the target reference state in a case that the process of the target reference state satisfies the preset condition.

The reference state includes: Radio Link Monitor (RLM) and/or Beam Failure Detection (BFD).

In a case that processes of one or more reference states (RLM or BFD) is running, a terminal in some embodiments of the present disclosure determines whether a process of a target reference state satisfies a preset condition according to a monitoring configuration parameter of a reference state, a monitoring result corresponding to the target reference state is determined; it is specified how to determine a monitoring result in a case that multiple RLM (or BFD) processes run at the same time, so as to improve a communication process and ensure reliability of network communication.

It should be understood that, in some embodiments of the present disclosure, the radio frequency unit 310 may be used to receive and send information or send and receive signals during a call. Specifically, downlink data from a network device is received and processed by the processor 311; in addition, uplink data is sent to the network device. Generally, the radio frequency unit 310 includes, but is not limited to, an antenna, at least one amplifier, a transceiver, a coupler, a low-noise amplifier, a duplexer, and the like. In addition, the radio frequency unit 310 may also communicate with a network and other devices through a wireless communication system.

The terminal provides users with wireless broadband Internet access through the network module 320, such as helping users to send and receive emails, to browse web pages, and to access streaming media, etc.

The audio output unit 330 may convert audio data received by the radio frequency unit 310 or the network module 320 or stored in the storage 390 into audio signals and output them as sound. Moreover, the audio output unit 330 may also provide audio output (for example, a call signal reception sound, a message reception sound, etc.) related to a specific function performed by the terminal 30. The audio output unit 330 includes a speaker, a buzzer, a receiver, and the like.

The input unit 340 is used to receive audio signals or video signals. The input unit 340 may include a graphics processing unit (Graphics Processing Unit, GPU) 341 and a microphone 342, and the graphics processing unit 341 processes image data of a still picture or video obtained by an image capture device (such as a camera) in a video capture mode or an image capture mode. The processed image frames may be displayed on the display unit 360. The image frames processed by the graphics processing unit 341 may be stored in the storage 390 (or other storage medium) or transmitted via the radio frequency unit 310 or the network module 320. The microphone 342 may receive sound, and may process such sound into audio data. The processed audio data may be converted into a format output that may be transmitted to a mobile communication network device via the radio frequency unit 310 in the case of a telephone call mode.

The terminal 30 further includes at least one sensor 350, such as a light sensor, a motion sensor, and other sensors. Specifically, the light sensor includes an ambient light sensor and a proximity sensor, wherein the ambient light sensor may adjust brightness of a display panel 361 according to brightness of the ambient light, and the proximity sensor may turn off the display panel 361 and/or backlight in a case that the terminal 30 is moved close to an ear. As a type of the motion sensor, an accelerometer sensor may detect a magnitude of acceleration in various directions (usually three axes), and detect a magnitude and a direction of gravity in the case of stationary, and be used to identify an attitude of the terminal (such as horizontal-vertical screen switching, related games, magnetometer attitude calibration), vibration recognition related functions (such as pedometer, tap), etc.; the sensor 350 may also include a fingerprint sensor, a pressure sensor, an iris sensor, a molecular sensor, a gyroscope, a barometer, a hygrometer, a thermometer, an infrared sensor and the like, which are not repeated here.

The display unit 360 may be configured to display information inputted by the user or information provided to the user. The display unit 360 may include the display panel 361, and the display panel 361 may be configured as a form of a liquid crystal display (Liquid Crystal Display, LCD), an organic light-emitting diode (Organic Light-Emitting Diode, OLED) or the like.

The user input unit 370 may be used to receive inputted numeric information or character information and generate a signal input related to user's settings and related to a function control of the terminal. Specifically, the user input unit 370 includes a touch panel 371 and other input devices 372. The touch panel 371, also referred to as a touch screen, may collect a touch operation of a user thereon or nearby (such as the user's operation on the touch panel 371 or near the touch panel 371 using any suitable object or accessory such as a finger or a stylus). The touch panel 371 may include two parts, namely a touch detection device and a touch controller. The touch detection device detects a touch orientation of ae user, and detects a signal generated by the touch operation, and transmits the signal to the touch controller; the touch controller receives touch information from the touch detection device, converts the touch information into a coordinate of a touch point, transmits the coordinate to the processor 311, and may receive and execute a command from the processor 311. In addition, the touch panel 371 can be implemented in various types such as a resistive type, a capacitive type, an infrared type, and a surface acoustic wave type, etc. In addition to the touch panel 371, the user input unit 370 may further include other input devices 372. Specifically, the other input devices 372 may include, but are not limited to, a physical keyboard, a function button (such as a volume control button, a switch button, etc.), a trackball, a mouse, and a joystick, and details thereof are not described herein again.

Further, the touch panel 371 may cover the display panel 361, in a case that the touch panel 371 detects a touch operation thereon or nearby, the touch operation is transmitted to the processor 311 to determine the type of the touch event, then the processor 311 provides a corresponding visual output on the display panel 361 based on the type of the touch event. Although in FIG. 3, the touch panel 371 and the display panel 361 are implemented as two independent components to implement input and output functions of the terminal, in some embodiments, the touch panel 371 and the display panel 361 may be integrated to implement the input and output functions of the terminal, which are not limited here.

The interface unit 380 is an interface through which an external device is connected to the terminal 30. For example, the external device may include a wired or wireless headset port, an external power supply (or a battery charger) port, a wired or wireless data port, a storage card port, a port for connecting a device with an identification module, and an audio input/output (I/O) port, a video I/O port, or a headphone port, etc. The interface unit 380 may be used to receive input (e.g., data information, power, etc.) from the external device and transmit the received input to one or more components within the terminal 30 or may be used to transmit data between the terminal 30 and the external device.

The storage 390 may be used to store software programs and various data. The storage 390 may mainly include a storage program area and a storage data area, wherein the storage program area may store an operating system, an application program (such as a sound playback function, an image playback function, etc.) required by at least one function, and the like; the storage data area may store data (such as audio data, a phone book, etc.) created based on the use of a mobile phone and the like. In addition, the storage 390 may include a high-speed random access storage, and may further include a non-transitory storage, such as at least one magnetic disk storage device, a flash memory device, or other volatile solid-state storage device.

The processor 311 is a control center of the terminal, and uses various interfaces and lines to connect various parts of the entire terminal. By running or executing software programs and/or modules stored in the storage 390 and calling data stored in the storage 390, various functions of the terminal are performed by the processor and data is processed by the processor, so that the overall monitoring of the terminal is performed. The processor 311 may include one or more processing units; optionally, the processor 311 may integrate an application processor and a modem processor, wherein the application processor mainly processes an operating system, a user interface, and an application program, etc. The modem processor mainly handles wireless communication. It could be understood that the modem processor may not be integrated into the processor 311.

The terminal 30 may further include a power supply 312 (such as a battery) for supplying power to various components. Optionally, the power supply 312 may be logically connected to the processor 311 through a power management system, so as to implement functions such as management of charging, management of discharging, and power consumption management through the power management system.

In addition, the terminal 30 includes some functional modules that are not shown, and details are not described herein again.

Optionally, some embodiments of the present disclosure further provide a terminal, and the terminal includes: a processor 311, a storage 390, and a computer program stored in the storage 390 and executable by the processor 311; when the computer program is used to executed by the processor 311, the processor 311 implements various processes in embodiments of the method of determining the monitoring result performed by a terminal side, and the same technical effects may be achieved, which will not be repeated herein to avoid repetition.

Some embodiments of the present disclosure also provide a computer readable storage medium, a computer program is stored on the computer readable storage medium, and the computer program is executed by a processor to implement various processes in embodiments of the method of determining the monitoring result performed by a terminal side, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

The descriptions above are optional embodiments of the present disclosure. It should be noted that, those skilled in the art may make various improvements and embellishments without departing from principles described in the present disclosure, and the various improvements and the embellishments shall be within the protection scope of the present disclosure.

What is claimed is:

1. A method of determining a monitoring result, performed by a terminal, comprising:
    determining, in a case that processes of multiple reference states are running, whether at least one process of a target reference state of the multiple reference states satisfies a preset condition according to one or more monitoring configuration parameters of the multiple reference states;
    determining a monitoring result corresponding to the target reference state in a case that the at least one process of the target reference state satisfies the preset condition;
    wherein the multiple reference states comprise Radio Link Monitor (RLM) and/or Beam Failure Detection (BFD),
    wherein, the one or more monitoring configuration parameters comprises one or more of:
        a set of reference state configuration parameters configured for at least one Reference Signal (RS) of the terminal; or
        at least one set of reference state configuration parameters configured for at least one RS set of the terminal;
    the at least one set of reference state configuration parameters comprises at least one of: a preset counter for the multiple reference states, a timing duration of a timer for the multiple reference states;
    the preset counter comprises an out-of-synchronization counter and an in-synchronization counter in a case that the multiple reference states comprise the RLM.

2. The method of determining the monitoring result according to claim 1, wherein, the one or more monitoring configuration parameters comprise one or more of following:
    a set of reference state configuration parameters configured for the terminal;
    at least one set of reference state configuration parameters configured for at least one bandwidth part (BWP) of the terminal;
    at least one set of reference state configuration parameters configured for at least one cell of the terminal;
    at least one set of reference state configuration parameters configured for at least one carrier of the terminal;
    at least one set of reference state configuration parameters configured for at least one bandwidth of the terminal or at least one combination of bandwidths of the terminal.

3. The method of determining the monitoring result according to claim 2, wherein, the at least one BWP comprises: at least one activated BWP and/or at least one configured BWP;
    the at least one cell comprises: at least one serving cell and/or at least one configured cell.

4. The method of determining the monitoring result according to claim 1, wherein,
    the preset counter comprises a beam failure instance counter in a case that the multiple reference states comprise the BFD.

5. The method of determining the monitoring result according to claim 4, wherein, in a case that the multiple reference states comprise the RLM, the preset condition comprises a condition that the timer expires;
    wherein, the preset timer starts in a case that a first preset number of consecutive out-of-synchronization indications are received from a bottom layer, and the timer stops running in a case that a second preset number of consecutive in-synchronization indications are received before expiration;
    in a case that the multiple reference states comprise the BFD, the preset condition comprises a condition that the beam failure instance counter reaches a third preset number;
    in a case that a beam failure instance indicated by the bottom layer is received by the beam failure instance counter, a count value of the beam failure instance counter is increased by one, and the timer starts, and a count value of the beam failure instance counter is reset in a case that the timer expires.

6. The method of determining the monitoring result according to claim 1, wherein, determining the monitoring result corresponding to the target reference state comprises at least one of the following:
    indicating a higher-layer of the terminal;
    declaring as Radio Link Failure (RLF) or determining Beam Failure Recovery (BFR);
    determining that a reference state on at least one target resource of an upper layer of the terminal satisfies a preset condition;
    triggering, in a case that a reference state on at least one target resource satisfies a preset condition, RLF or BFR on a corresponding at least one target resource;
    initiating, in a case that a reference state on at least one target resource satisfies a preset condition, a Radio Resource Control (RRC) reestablishment on a corresponding at least one target resource;
    reporting reported information to a network device;
    wherein, the target resource comprises: a RS, a RS set, a BWP, a cell, a carrier, a bandwidth or a combination of bandwidths.

7. The method of determining the monitoring result according to claim 6, wherein, the reported information comprises at least one of the following:
    that the at least one process of the target reference state satisfies a preset condition;

that the at least one process of the target reference state triggers RLF or BFR on a target resource;
that the at least one process of the target reference state initiates an RRC reestablishment on a target resource.

8. The method of determining the monitoring result according to claim 1, wherein, the at least one process of the target reference state comprises at least one of:
a reference state run on an initial BWP;
a reference state run on a first activated BWP;
a reference state run on a serving cell;
a reference state run on a primary cell;
a reference state run on a BWP, a cell or a RS, where there is a cell-defined synchronization signal block;
a reference state run on a cell, a BWP or a RS, where there is preset indication information;
wherein, the preset indication information is used to indicate a serving cell, a BWP of a serving cell, or a RS of a serving cell.

9. A terminal, comprising:
a storage, a processor, and a computer program stored on the storage and executable by the processor, wherein in a case that the computer program is executed by the processor, a method of determining a monitoring result is implemented, the method comprises:
determining, in a case that processes of multiple reference states are running, whether at least one process of a target reference state of the multiple reference states satisfies a preset condition according to one or more monitoring configuration parameters of the multiple reference state;
determining a monitoring result corresponding to the target reference state in a case that the at least one process of the target reference state satisfies the preset condition;
wherein the multiple reference states comprise Radio Link Monitor (RLM) and/or Beam Failure Detection (BFD),
wherein, the one or more monitoring configuration parameters comprises one or more of:
a set of reference state configuration parameters configured for at least one Reference Signal (RS) of the terminal; or
at least one set of reference state configuration parameters configured for at least one RS set of the terminal;
the at least one set of reference state configuration parameters comprises at least one of: a preset counter for the multiple reference states, a timing duration of timer for the multiple reference states;
the preset counter comprises an out-of-synchronization counter and an in-synchronization counter in a case that the multiple reference states comprise the RLM.

10. The terminal according to claim 9, wherein, the one o more monitoring configuration parameters comprise one or more of following:
a set of reference state configuration parameters configured for the terminal;
at least one set of reference state configuration parameters configured for at least one bandwidth part (BWP) of the terminal;
at least one set of reference state configuration parameters configured for at least one cell of the terminal;
at least one set of reference state configuration parameters configured for at least one carrier of the terminal;
at least one set of reference state configuration parameters configured for at least one bandwidth of the terminal or at least one combination of bandwidths of the terminal.

11. The terminal according to claim 10, wherein, the at least one BWP comprises: at least one activated BWP and/or at least one configured BWP;
the at least one cell comprises: at least one serving cell and/or at least one configured cell.

12. The terminal according to claim 9, wherein,
the preset counter comprises a beam failure instance counter in a case that the multiple reference states comprise the BFD.

13. The terminal according to claim 12, wherein, in a case that the multiple reference states comprise the RLM, the preset condition comprises a condition that the timer expires;
wherein, the preset timer starts in a case that a first preset number of consecutive out-of-synchronization indications are received from a bottom layer, and the timer stops running in a case that a second preset number of consecutive in-synchronization indications are received before expiration;
in a case that the one or more reference states comprise the BFD, the preset condition comprises a condition that the beam failure instance counter reaches a third preset number;
in a case that a beam failure instance indicated by the bottom layer is received by the beam failure instance counter, a count value of the beam failure instance counter is increased by one, and the timer starts, and a count value of the beam failure instance counter is reset in a case that the timer expires.

14. The terminal according to claim 9, wherein, determining the monitoring result corresponding to the target reference state comprises at least one of the following:
indicating a higher-layer of the terminal;
declaring as Radio Link Failure (RLF) or determining Beam Failure Recovery (BFR);
determining that a reference state on at least one target resource of an upper layer of the terminal satisfies a preset condition;
triggering, in a case that a reference state on at least one target resource satisfies a preset condition, RLF or BFR on a corresponding at least one target resource;
initiating, in a case that a reference state on at least one target resource satisfies a preset condition, a Radio Resource Control (RRC) reestablishment on a corresponding at least one target resource;
reporting reported information to a network device;
wherein, the target resource comprises: a RS, a RS set, a BWP, a cell, a carrier, a bandwidth or a combination of bandwidths.

15. The terminal according to claim 14, wherein, the reported information comprises at least one of the following:
that the at least one process of the target reference state satisfies a preset condition;
that the at least one process of the target reference state triggers RLF or BFR on a target resource;
that the at least one process of the target reference state initiates an RRC reestablishment on a target resource.

16. The terminal according to claim 9, wherein, the at least one process of the target reference state comprises at least one of:
a reference state run on an initial BWP;
a reference state run on a first activated BWP;
a reference state run on a serving cell;
a reference state run on a primary cell;
a reference state run on a BWP, a cell or a RS, where there is a cell-defined synchronization signal block;

a reference state run on a cell, a BWP or a RS, where there is preset indication information;
wherein, the preset indication information is used to indicate a serving cell, a BWP of a serving cell, or a RS of a serving cell.

17. A non-transitory computer readable storage medium, wherein a computer program is stored on the computer readable storage medium, in a case that the computer program is executed by a processor, a method of determining a monitoring result is implemented, the method comprises:
   determining, in a case that processes of multiple reference states are running, whether at least one process of a target reference state of the multiple reference states satisfies a preset condition according to one or more monitoring configuration parameters of the multiple reference states;
   determining a monitoring result corresponding to the target reference state in a case that the at least one process of the target reference state satisfies the preset condition;
   wherein the multiple reference states comprise Radio Link Monitor (RLM) and/or Beam Failure Detection (BFD),
   wherein, the one or more monitoring configuration parameters comprises one or more of:
      a set of reference state configuration parameters configured for at least one Reference Signal (RS) of the terminal; or
      at least one set of reference state configuration parameters configured for at least one RS set of the terminal;
   the at least one set of reference state configuration parameters comprises at least one of: a preset counter for the multiple reference states, a timing duration of a timer for the multiple reference states;
   the preset counter comprises an out-of-synchronization counter and an in-synchronization counter in a case that the multiple reference states comprise the RLM.

18. The non-transitory computer readable storage medium according to claim 17, wherein the one or more monitoring configuration parameters comprises one or more of following:
   a set of reference state configuration parameters configured for the terminal;
   at least one set of reference state configuration parameters configured for at least one bandwidth part (BWP) of the terminal;
   at least one set of reference state configuration parameters configured for at least one cell of the terminal;
   at least one set of reference state configuration parameters configured for at least one carrier of the terminal;
   at least one set of reference state configuration parameters configured for at least one bandwidth of the terminal or at least one combination of bandwidths of the terminal.

* * * * *